United States Patent
Ikeda

(10) Patent No.: US 9,352,494 B2
(45) Date of Patent: May 31, 2016

(54) MOLDING DIE

(75) Inventor: Kouji Ikeda, Kariya (JP)

(73) Assignee: Toyota Shatai Kabushiki Kaisha (JP)

(*) Notice: Subject to any disclaimer, the term of this patent is extended or adjusted under 35 U.S.C. 154(b) by 0 days.

(21) Appl. No.: 14/119,763

(22) PCT Filed: Jul. 9, 2012

(86) PCT No.: PCT/JP2012/067458
§ 371 (c)(1),
(2), (4) Date: Nov. 22, 2013

(87) PCT Pub. No.: WO2013/008777
PCT Pub. Date: Jan. 17, 2013

(65) Prior Publication Data
US 2014/0106019 A1    Apr. 17, 2014

(30) Foreign Application Priority Data

Jul. 12, 2011    (JP) ................. 2011-154136

(51) Int. Cl.
*B29C 33/44*    (2006.01)
*B29C 45/44*    (2006.01)
*B29C 45/33*    (2006.01)
*B29L 31/30*    (2006.01)

(52) U.S. Cl.
CPC ........... *B29C 33/442* (2013.01); *B29C 45/4407* (2013.01); *B29C 45/33* (2013.01); *B29L 2031/3044* (2013.01)

(58) Field of Classification Search
CPC .......... B29C 45/44; B29C 45/4407; B29C 2045/4414; B29C 45/4421; B29C 2045/4428; B29C 45/4435; B29C 2045/4442; B29C 2045/445; B29C 45/4457; B29C 2045/4464; B29C 45/4471; B29C 45/4478; B29C 2045/4485; B29C 2045/4492
USPC ........... 264/318; 425/557, 441, 444, 436 RM
See application file for complete search history.

(56) References Cited

U.S. PATENT DOCUMENTS

| 3,986,698 | A | * | 10/1976 | Darnall, Jr. | .............. | 249/163 |
| 4,933,133 | A | * | 6/1990 | Brown | .............. | B29C 45/4407 264/318 |
| 5,766,655 | A | * | 6/1998 | Tajiri et al. | ............... | 425/556 |

FOREIGN PATENT DOCUMENTS

| JP | 53-014693 Y2 | 4/1978 |
| JP | 61-111712 U | 7/1986 |
| JP | 07-052733 A | 2/1995 |
| JP | 10-071634 A | 3/1998 |

OTHER PUBLICATIONS

PCT International Preliminary Report on Patentability Form PCT/IB/373, PCT Written Opinion of the International Search Authority PCT/ISA/237 for PCT/JP2012/067458 (4 total pages).

* cited by examiner

*Primary Examiner* — Timothy Kennedy

(74) *Attorney, Agent, or Firm* — Patterson Thuente & Pedersen, P.A.

(57) ABSTRACT

Provided is a molding die including a die body for molding a molded article, which has an undercut, and a demolding core movable to approach and separate from the die body. When the demolding core is separated from the die body, the demolding core elastically deforms the molded article such that the undercut separates from the die body and makes it possible to remove the molded article from the die body. The die body includes a recess where the depth gradually reduces along the direction in which the demolding core separates from the die body. During molding of the molded article, a projection is formed on the undercut in accordance with the shape of the recess. During removal of the molded article, the engagement between the projection and the recess regulates the movement of the molded article in a direction intersecting the movement direction of the demolding core.

1 Claim, 9 Drawing Sheets

MOLDING DIE

PRIORITY CLAIM

The present application is a National Phase entry of PCT Application No. PCT/JP2012/067458, filed Jul. 9, 2012, which application claims priority to Japanese Patent Application No. 2011-154136, filed Jul. 12, 2011, both of said applications being hereby incorporated by reference in their entirety.

BACKGROUND OF THE INVENTION

This invention relates to a molding die for a molded article made of synthetic plastic and more specifically, to a molding die with a demolding core.

As an example, Japanese Laid-Open Patent Publication No. H10-71634 discloses a conventional molding die relating to a similar technique. As shown in FIGS. 21(a) and 21(b), this molding die includes a movable die 52 by which a bumper 51 with an undercut 50 is formed, and a demolding core 53 that moves relative to the movable die 52 to demold the bumper 51 from the movable die 52. As shown in FIG. 21(b), in response to movement of the demolding core 53, the bumper 51 deforms elastically such that the undercut 50 moves away from the movable die 52, thereby allowing detachment of the bumper 51 from the movable die 52.

If the bumper 51 is one that is to be attached to a vehicle, the bumper 51 generally has rigidity higher at its lower edge part than at its upper edge part, as shown in a partial view of FIG. 22. This is because the bumper merely has an abutment section 51a at its upper edge part that is to abut against right and left fenders or a front grille to be coupled thereto, whereas it has a flange section 51b at its lower edge part that is to extend to face lower part of a vehicle body.

If the bumper 51 is formed by a molding die such as that described in Japanese Laid-Open Patent Publication No. H10-71634 and the molded bumper 51 is to be detached from a movable die, the demolding core 53 is moved in the direction of arrow P to spread the undercut 50 outward (to the right of FIG. 23), as shown in FIG. 23. Lower part of the bumper 51 has high rigidity. Thus, the lower part of the bumper 51 deforms by an amount smaller than the deformation amount of upper part of the bumper 51. This enables the bumper 51 to move in a manner shown by arrow Q of FIG. 23. Specifically, the bumper 51 moves outward in the movement direction of the demolding core 53 and at the same time, it may also move in a direction perpendicular to the movement direction of the demolding core 53. In this case, friction may be caused between a surface of the undercut 50 (surface of a hatched area of FIG. 23) and a corner of the demolding core 53, thereby making a scratch on this surface. Hence, if the bumper 51 is attached to a vehicle and the undercut 50 forms part of the interior of a wheel arch of the vehicle, a problem may be caused that the scratch is visible from outside the vehicle.

Japanese Laid-Open Patent Publication No. H07-52733 discloses a structure where multiple ribs are formed on the rear surface of an undercut of a bumper with the intention of enhancing the rigidity of the undercut of the bumper. However, these ribs increase the weight of the bumper.

SUMMARY OF THE INVENTION

The present invention was made for solving the above problems in the prior art. It is an objective of the present invention to provide a molding die that enhances the molding quality of a molded article at an undercut of the molded article.

To achieve the foregoing objective, and in accordance with one aspect of the present invention, a molding die is proposed that includes a die body for forming a molded article with an undercut, and a demolding core arranged to move toward and away from the die body. While moving away from the die body, the demolding core elastically deforms the molded article such that the undercut moves away from the die body, thereby making the molded article detachable from the die body. The die body includes a molding surface for forming the undercut. The molding die includes a recessed portion formed in the molding surface of the die body. Recessed portion is reduced in depth gradually in a direction in which the demolding core moves away from the die body. A projecting portion is formed on the undercut in conformity with the shape of the recessed portion during formation of the molded article. During detachment of the molded article, engagement between the projecting portion of the undercut and the recessed portion of the die body restricts movement of the molded article in a direction crossing the movement direction of the demolding core.

In this case, even if a factor such as difference in rigidity of a bumper observed in a direction crossing the movement direction of the demolding core generates force in the bumper that moves the bumper in this crossing direction, engagement between the recessed portion and the projecting portion restricts movement of the bumper in the crossing direction while the demolding core moves. This prevents sliding motion of the undercut along the demolding core, thereby avoiding a scratch on the undercut due to the sliding motion.

It is preferable that the recessed portion has a groove shape and extends in the movement direction of the demolding core, and the projecting portion has a ridge shape.

In this case, only the projecting portion of a ridge shape is formed on a surface of the undercut, thereby preventing the undercut and eventually, the bumper from increasing in weight more than necessary.

In accordance with another aspect of the present invention, a molding die is proposed that includes a die body for forming a molded article with an undercut, and a demolding core arranged to move toward and away from the die body. While moving away from the die body, the demolding core elastically deforms the molded article such that the undercut moves away from the die body, thereby making the molded article detachable from the die body. The die body includes a molding surface for forming the undercut. The molding die being characterized by a projecting portion formed on the molding surface of the die body while being increased in height gradually in a direction in which the demolding core moves away from the die body. A recessed portion is formed in the undercut in conformity with the shape of the projecting portion during formation of the molded article. During detachment of the molded article, engagement between the recessed portion of the undercut and the projecting portion of the die body restricts movement of the molded article in a direction crossing the movement direction of the demolding core.

This aspect achieves the same operation and advantages as those achieved by the aforementioned aspect.

It is preferable that the projecting portion has a ridge shape and extends in the movement direction of the demolding core, and the recessed portion has a groove shape.

In this case, only the recessed portion of a groove shape is formed in a surface of the undercut, thereby preventing reduction in rigidity of the undercut.

DETAILED DESCRIPTION OF THE PREFERRED EMBODIMENTS

An embodiment that embodies this invention is described next by referring to FIGS. 1 to 13.

Figure 1:
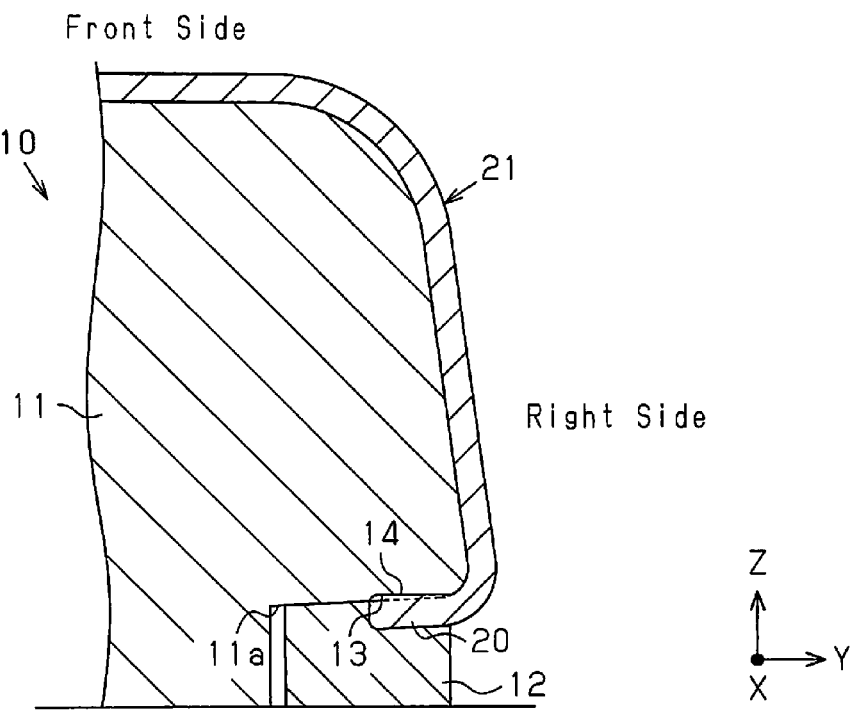
FIG. 1 is a cross-sectional view showing part of a molding die for a bumper according to one embodiment.
Figure 2:
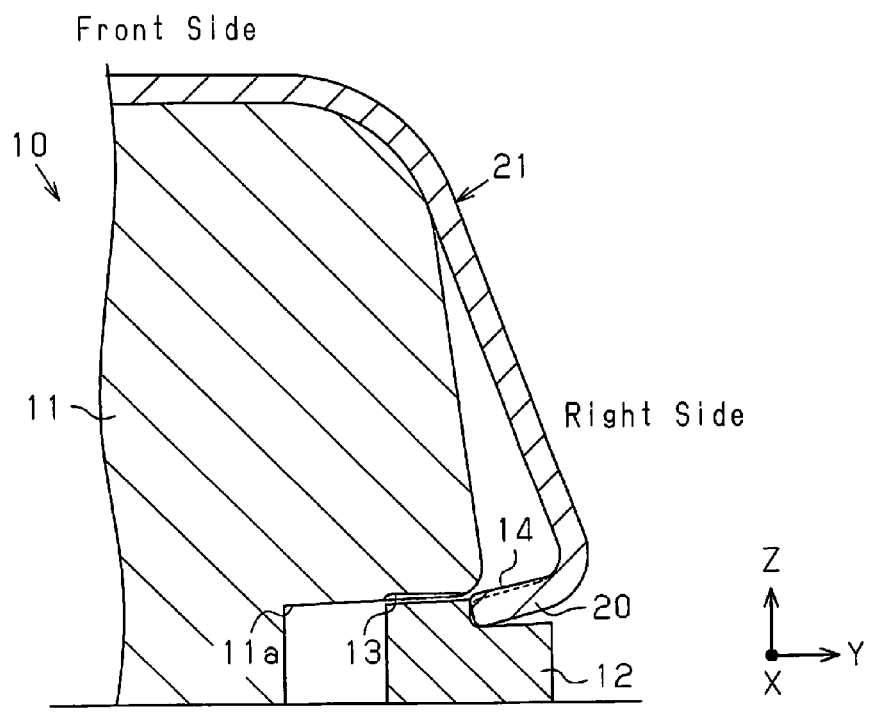
FIG. 2 is a cross-sectional view showing part of the molding die for a bumper according to the embodiment of FIG. 1.

A molding die 10, a part of which is shown in FIG. 1, is configured to form a vehicle bumper out of synthetic plastic as a molded article. The molding die 10 includes a die body and a demolding core 12. The die body is composed of a fixed die not shown in the drawings, and a movable die 11 that acts cooperatively with the fixed die to form a bumper 21 with an undercut 20. The demolding core 12 functions to demold the molded bumper 21 from the movable die 11 toward a parting direction (Z direction). The demolding core 12 is moved toward a direction (Y direction) perpendicular to the parting direction (Z direction) to be away from the movable die 11. The demolding core 12 engages the undercut 20. As shown in FIG. 2, when the demolding core 12 is moved in the Y direction relative to the movable die 11, the demolding core 12 elastically deforms the bumper 21 such that the undercut 20 moves away from the movable die 11 in the Y direction. Then, the bumper 21 becomes detachable from the movable die 11. FIGS. 1 and 2 show part of the molding die 10 corresponding to part of the bumper 21 where the undercut 20 is formed. The remaining part of the molding die 10 not shown in the drawings has the same structure as the aforementioned structure of the conventional molding die.

Figure 3:
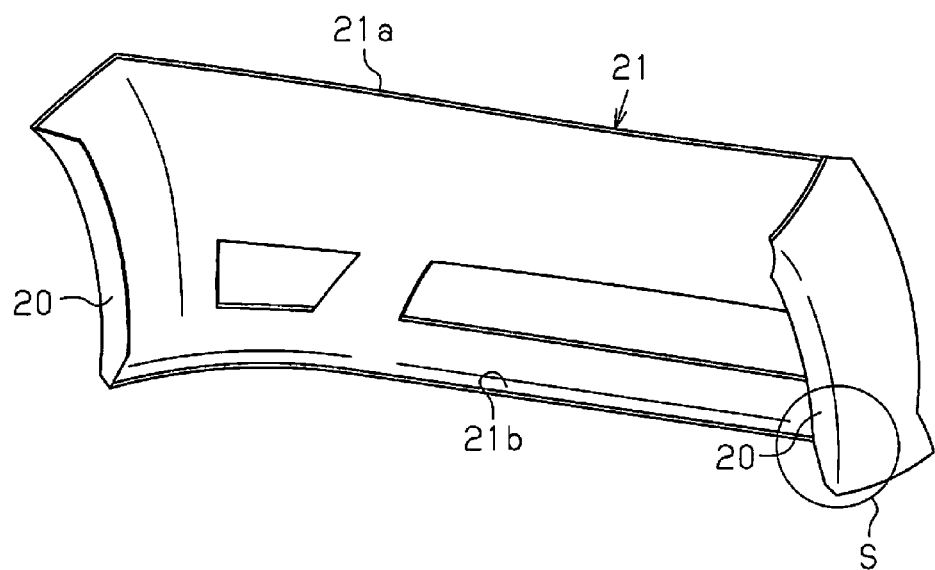
FIG. 3 is a perspective view of a bumper.
Figure 4:
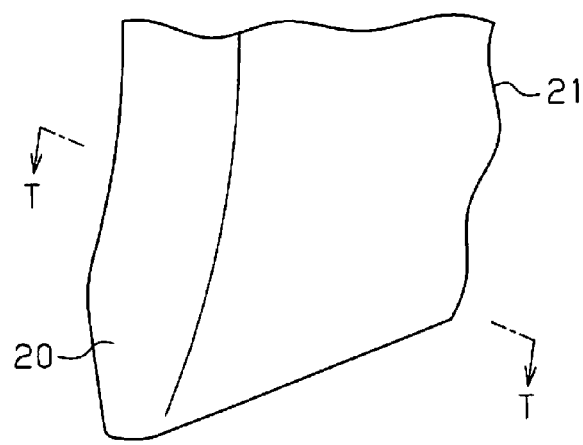
FIG. 4 shows an area S of FIG. 3 in an enlarged manner.

As shown in FIG. 3, the bumper 21 forms lower part of a front grille and respective front parts of right and left fenders of a vehicle. Upper edge part of the bumper 21 is formed as an abutment section 21a that is to abut against lower edge part of the front grille and to be connected to the front grille. Lower edge part of the bumper 21 is formed as a flange section 21b that is to extend to face lower part of a vehicle body. The undercut 20 to form a front side of a wheel arch is formed on each of the right and left sides of the bumper 21. As shown by arrows T of FIG. 4, part of the molding die 10 corresponds to part of the bumper 21 where the undercut 20 is formed.

Figure 5:
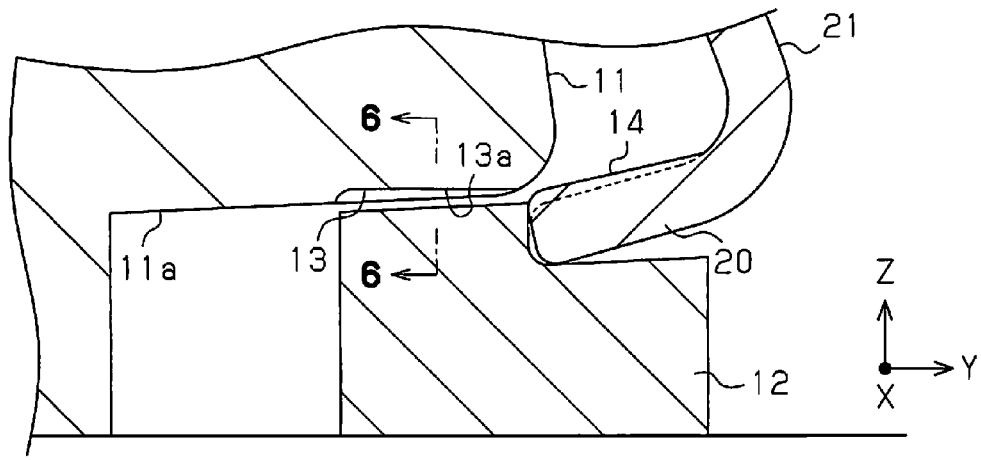
FIG. 5 is a cross-sectional view of the molding die showing an undercut during demolding of the bumper.
Figure 6:
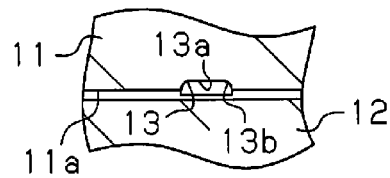
FIG. 6 is a cross-sectional view taken along line 6-6 of FIG. 5.

As shown in FIGS. 5 and 6, a molding surface 11a of the movable die 11 to form the undercut 20 is gradually inclined in the movement direction (Y direction) of the demolding core 12 to be shifted in the parting direction (Z direction). A recessed portion 13 of a groove shape is formed in the molding surface 11a for the undercut 20 to extend in the movement direction of the demolding core 12. The recessed portion 13 is formed to be reduced in depth linearly toward the movement direction of the demolding core 12. A bottom surface 13a of the recessed portion 13 extends parallel to the movement direction of the demolding core 12. Further, as shown in FIG. 6, opposite side surfaces 13b of the recessed portion 13 of a groove shape extend parallel to the movement direction (Y direction) of the demolding core 12.

Figure 7:
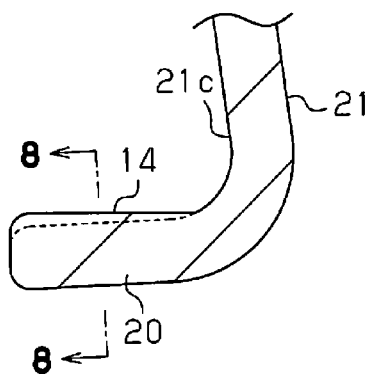
FIG. 7 is a cross-sectional view of the undercut showing a projecting portion.
Figure 8:
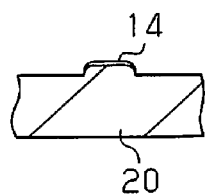
FIG. 8 is a cross-sectional view taken along line 8-8 of FIG. 7.
Figure 9:
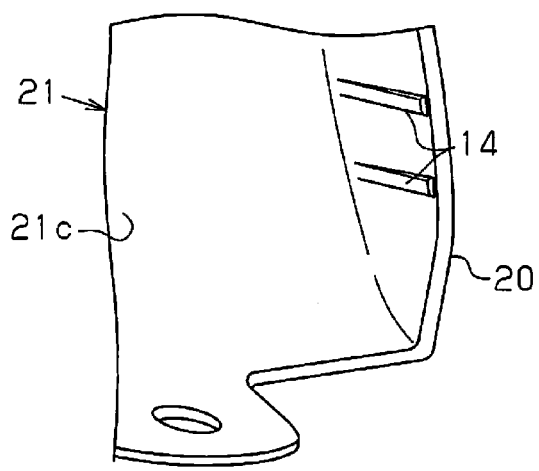
FIG. 9 is a perspective view of the undercut showing the projecting portion.

As shown in FIGS. 7, 8 and 9, the recessed portion 13 forms a projecting portion 14 of a ridge shape on a surface of the undercut 20 that projects toward the front of the bumper 21. The projecting portion 14 is gradually reduced in height as it approaches a lateral inner surface 21c of the bumper 21. The recessed portion 13 engages the projecting portion 14 when the demolding core 12 is moved in the Y direction. Thus, the recessed portion 13 restricts movement of the undercut 20 in a direction (X direction) perpendicular to the movement direction (Y direction) of the demolding core 12. The bottom surface 13a of the recessed portion 13 is not always required to extend parallel to the movement direction of the demolding core 12 but it may tilt in the tilting direction of the molding surface 11a. Specifically, the recessed portion 13 can have any shape that allows movement of the demolding core 12 in the Y direction while making the recessed portion 13 engage the projecting portion 14 in the X direction during this movement of the demolding core 12.

Described next is how the molding die 10 of the aforementioned structure operates while the bumper 21 formed by the molding die 10 is demolded from the molding die 10.

Figure 10:
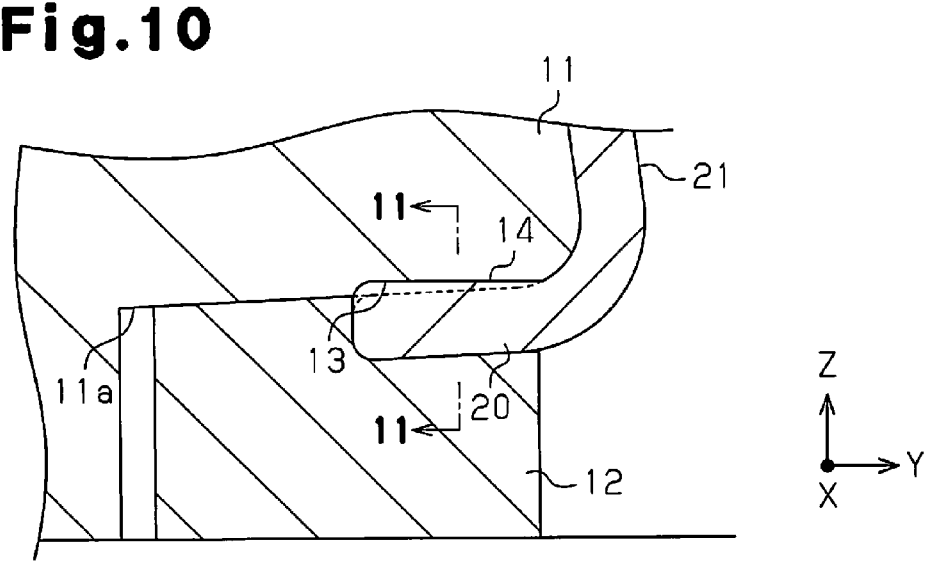
FIG. 10 is a cross-sectional view of the molding die showing how the projecting portion is formed.
Figure 11:
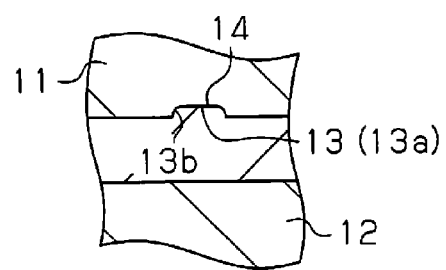
FIG. 11 is a cross-sectional view taken along line 11-11 of FIG. 10.

As shown in FIG. 1, the bumper 21 is formed by the molding die 10. A surface of the undercut 20 of the bumper 21 is provided with the projecting portion 14 of a ridge shape formed by the recessed portion 13 in the molding surface 11a of the movable die 11, as shown in FIGS. 9, 10 and 11. The projecting portion 14 is formed to be gradually reduced in height as it approaches the lateral inner surface 21c of the bumper 21. In this embodiment, two recessed portions 13 are provided in the movable die 11, and two projecting portions 14 are formed on the surface of the undercut 20 by these recessed portions 13. However, the number of the projecting portions 14 is not limited to two.

In this condition, when the demolding core 12 is moved in a direction (Y direction) perpendicular to the parting direction (Z direction), the undercut 20 is pressed in the Y direction by the demolding core 12. This elastically deforms the bumper 21 to move the undercut 20 in the Y direction, as shown in FIG. 12.

Figure 12:
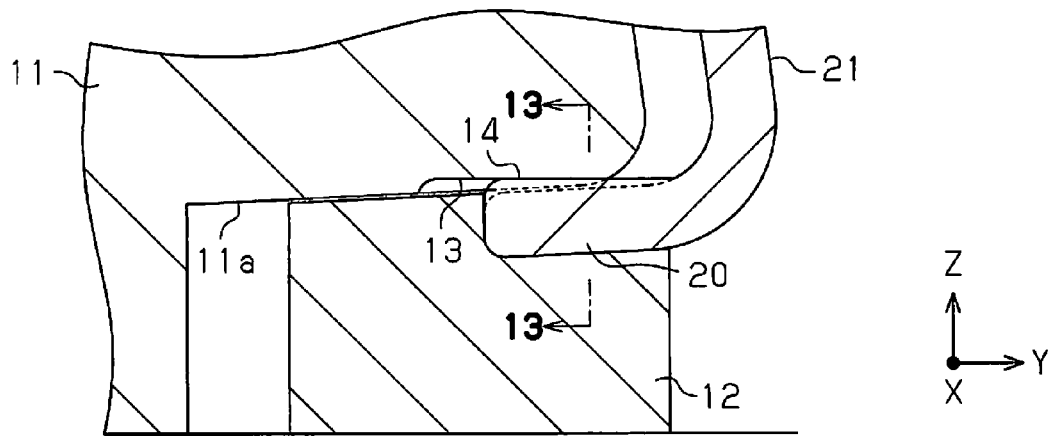
FIG. 12 is a cross-sectional view of the molding die showing the projecting portion during demolding of the bumper.
Figure 13:
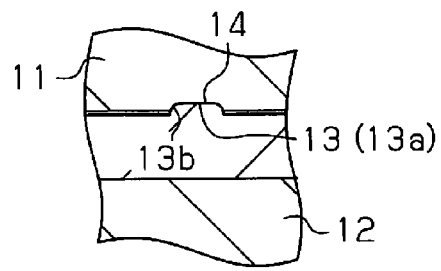
FIG. 13 is a cross-sectional view taken along line 13-13 of FIG. 12.

As shown in FIGS. 12 and 13, while the demolding core 12 moves, the opposite side surfaces of the projecting portion 14 of the bumper 21 slide on the opposite side surfaces of the recessed portion 13 of the movable die 11. This restricts displacement of the bumper 21 relative to the movable die 11 in a direction (X direction) perpendicular to the movement direction (Y direction) of the demolding core 12. As a result, even if the rigidity of the bumper 21 differs between an area near the abutment section 21a and an area near the flange section 21b, the bumper 21 will not move in a direction perpendicular to the movement direction of the demolding core 12 during demolding.

Further, as shown in FIGS. 2 and 5, when the undercut 20 is moved in the Y direction by the demolding core 12 to be away from the movable die 11, the bumper 21 becomes capable of being demolded from the movable die 11 in the parting direction (Z direction). At this time, the bumper 21 can be detached from the movable die 11 by moving the movable die 11 in the parting direction (Z direction).

The embodiment described in detail above has the following features.

(1) The recessed portion 13 is formed in the molding surface 11a of the movable die 11 to be reduced in depth gradually toward the movement direction of the demolding core 12. The projecting portion 14 is formed on the undercut 20 in conformity with this shape of the recessed portion 13. While the demolding core 12 moves in the movement direction (Y direction), engagement of the projecting portion 14 with the recessed portion 13 restricts movement of the bumper 21 in a direction (X direction) perpendicular to the movement direction (Y direction). Hence, even if a factor such as difference in rigidity of the bumper 21 observed in the aforementioned perpendicular direction (X direction) generates force in the bumper 21 that moves the bumper 21 in this perpendicular direction, movement of the bumper 21 in this perpendicular direction (X direction) is restricted while the demolding core 12 moves. This prevents sliding motion of the undercut 20 in the aforementioned perpendicular direction along the demolding core 12. Thus, scratches on the undercut 20 due to the sliding motion are avoided, thereby enhancing the quality of the bumper 21.

A terminal portion of the bumper disclosed in Patent Document 2 includes multiple ribs formed on the rear surface of the terminal portion to extend as far as to reach a lateral inner surface with the intention of increasing the rigidity of the terminal portion corresponding to an undercut. Unlike the ribs of Patent Document 2, the projecting portion 14 of the present invention does not extend as far as to reach the lateral inner surface 21c of the bumper 21, as shown in FIG. 7. Specifically, the projecting portion 14 is not intended to enhance the rigidity of the undercut 20, so that the rigidity of the undercut 20 with the projecting portion 14 is the same as that of the undercut 20 without the projecting portion 14.

(2) The recessed portion 13 of a groove shape is formed to extend in the movement direction of the demolding core 12. During formation by the molding die 10, the projecting portion 14 of a ridge shape is formed on a surface of the undercut 20 in conformity with the shape of the recessed portion 13. Hence, only the projecting portion 14 of a ridge shape is formed on the surface of the undercut 20, thereby preventing the undercut 20 and eventually, the bumper 21 from increasing in weight more than necessary.

(3) The molding die is used to form the bumper 21 made of synthetic plastic to be used in a vehicle. Forming the bumper 21 by this molding die can prevent scratches on the undercut 20 of the bumper 21 that might be made during demolding. Thus, if the undercut 20 forms part of a wheel arch viewable from outside, this reduces the probability of formation of a scratch on the wheel arch.

Embodiments of the present invention are not limited to the aforementioned embodiment but it may be modified as follows.

Figure 14:
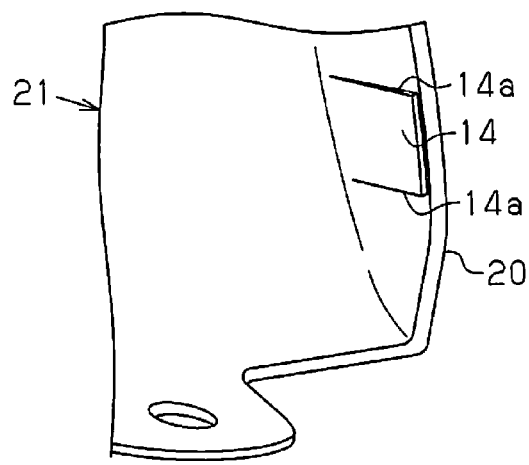
FIG. 14 is a perspective view of an undercut showing a projecting portion according to a modification.

In the aforementioned embodiment, the projecting portion 14 of a ridge shape is formed on a surface of the undercut 20 by the recessed portion 13 of a groove shape formed in the molding surface of the movable die 11. The recessed portion 13 may also be rectangular. In this case, the recessed portion 13 may be configured to form the projecting portion 14 on the surface of the undercut 20 having parallel outer side surfaces 14a while becoming lower gradually toward the movement direction of the demolding core 12, as shown in FIG. 14.

Figure 15:
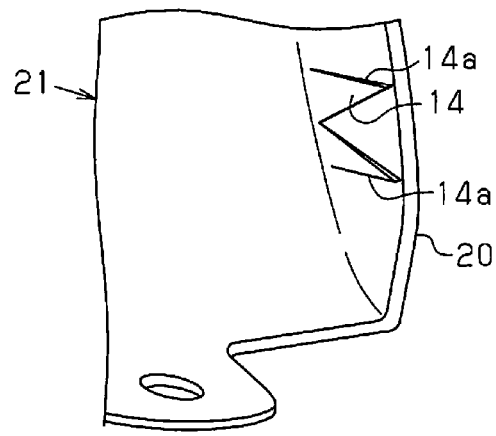
FIG. 15 is a perspective view of an undercut showing a projecting portion according to another modification.

In the aforementioned embodiment, the projecting portion 14 of a ridge shape is formed on a surface of the undercut 20 by the recessed portion 13 of a groove shape formed in the molding surface of the movable die 11. As shown in FIG. 15, the recessed portion 13 may also be configured to form the projecting portion 14 on the surface of the undercut 20 composed of two projecting sections triangular in cross section as viewed in the movement direction of the demolding core 12 while having two outer side surfaces 14a on the opposite sides thereof extending parallel to the movement direction of the demolding core 12. In this case, the recessed portion 13 is also configured to form the projecting portion 14 that is reduced in height gradually toward the movement direction of the demolding core 12.

Figure 16:
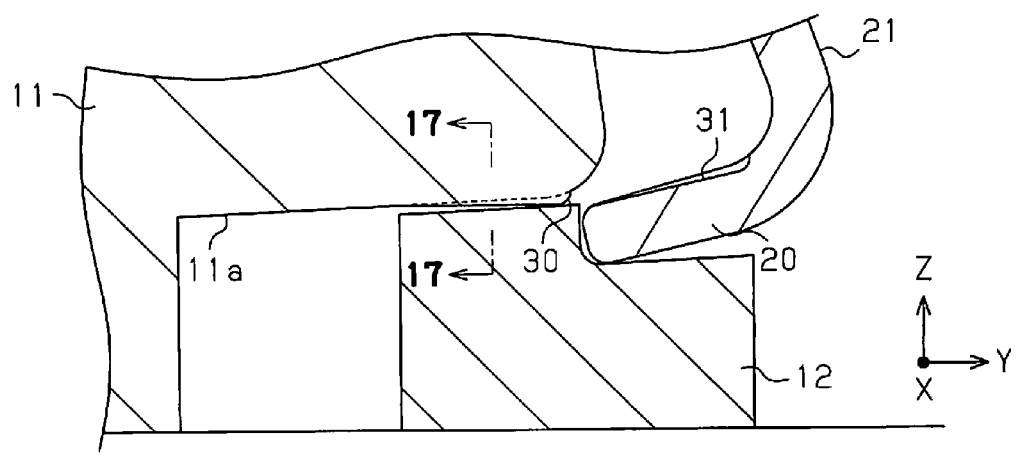
FIG. 16 is a cross-sectional view of a molding die showing how a projecting portion is formed in a still further modification.
Figure 17:
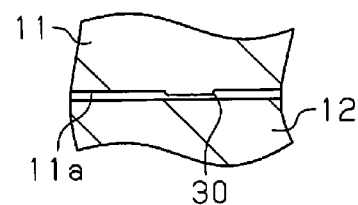
FIG. 17 is a cross-sectional view taken along line 17-17 of FIG. 16.
Figure 18:
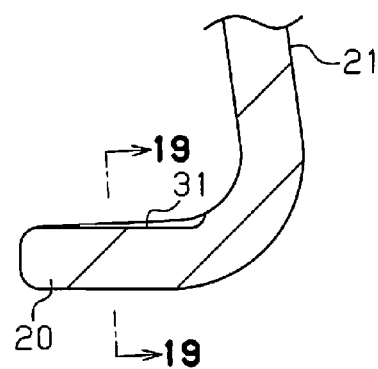
FIG. 18 is a cross-sectional view of an undercut showing a recessed portion according to the modification of FIG. 16.
Figure 19:
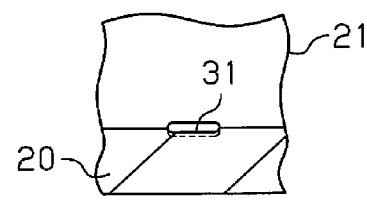
FIG. 19 is a cross-sectional view taken along line 19-19 of FIG. 18.
Figure 20:
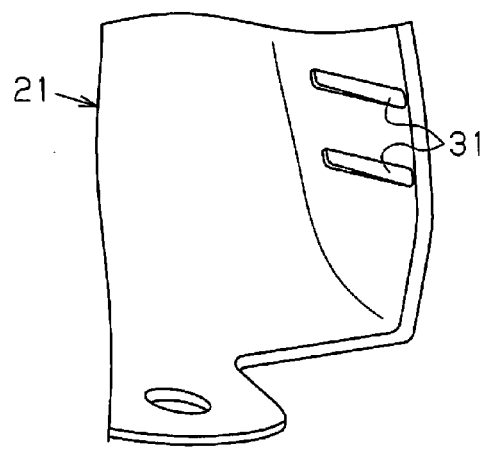
FIG. 20 is a perspective view of the undercut showing the recessed portion according to the modification of FIG. 16.
Figure 21:
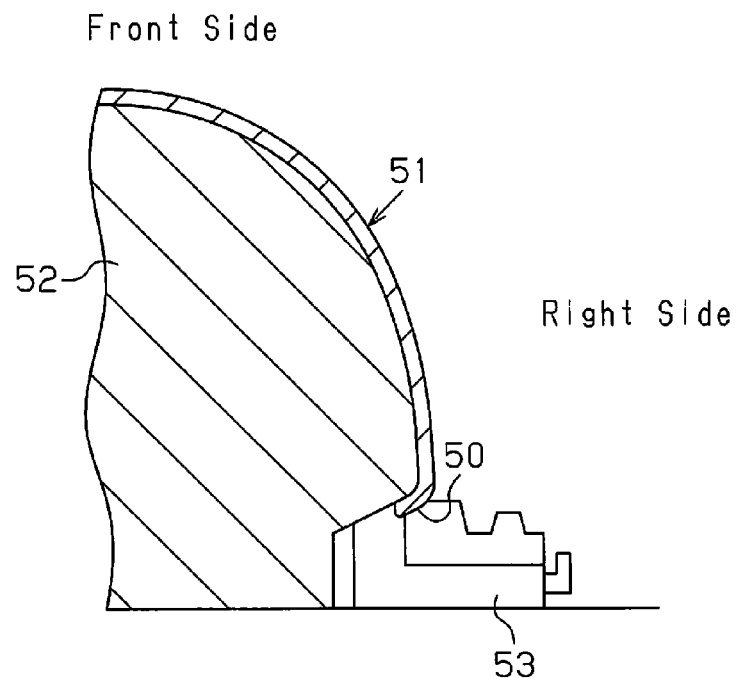
FIGS. 21(a) and 21(b) are partial cross-sectional views of a conventional molding die showing how an undercut is formed.
Figure 21:
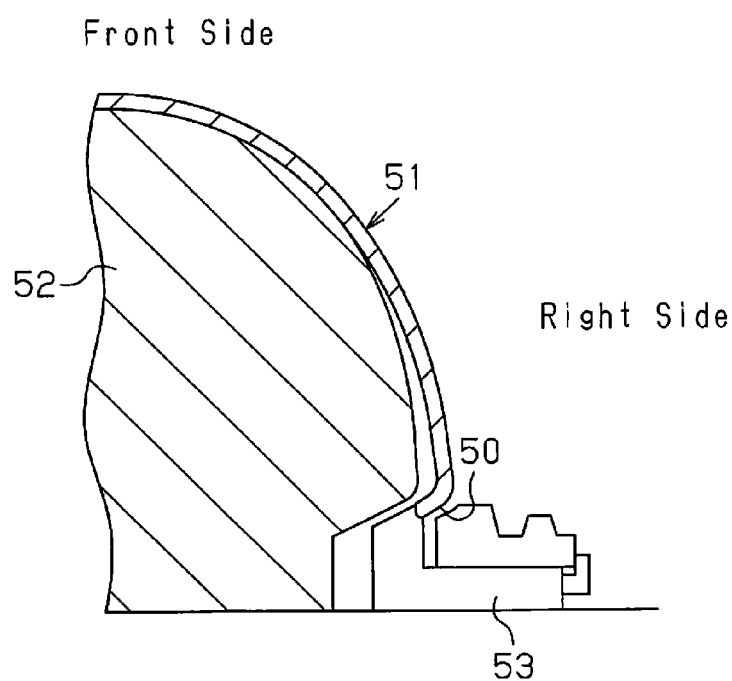
Figure 22:
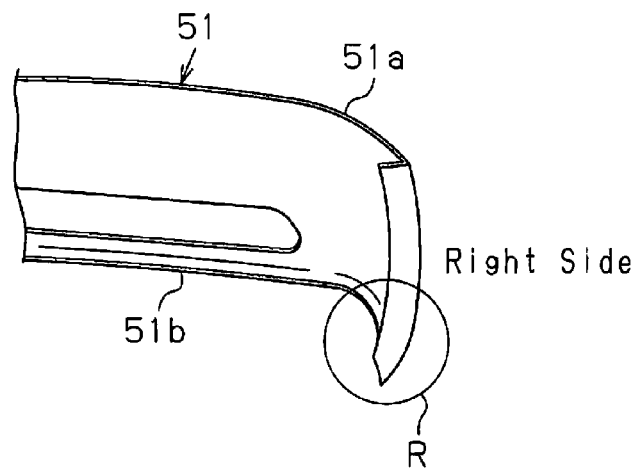
FIG. 22 is a perspective view of an undercut of a bumper.
Figure 23:
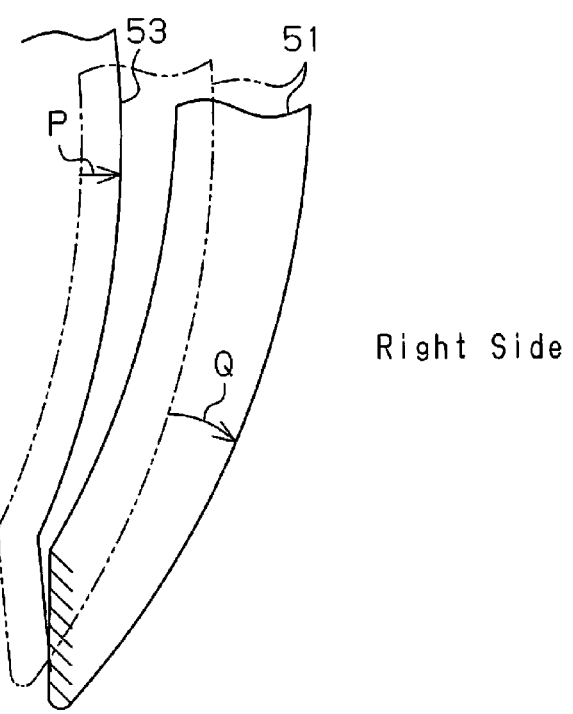
FIG. 23 is a schematic view of an area R of FIG. 22 taken from the rear surface of a product and schematically showing motion of the undercut during demolding.

As shown in FIGS. 16 and 17, a projecting portion 30 of a ridge shape may be formed on the molding surface 11a of the movable die 11 to extend in the movement direction (Y direction) of the demolding core 12 while being increased in height gradually toward this movement direction. As shown in FIGS. 18, 19 and 20, in conformity with this shape of the projecting portion 30, a recessed portion 31 of a groove shape is formed in a surface of the undercut 20 to be increased in depth gradually toward the movement direction of the demolding core 12. When the demolding core 12 moves in the Y direction for demolding of the bumper 21, the projecting portion 30 engages with the recessed portion 31 to restrict movement of the undercut 20 in the X direction. This structure also prevents the undercut 20 from sliding on the demolding core 12 in a direction perpendicular to the movement direction of the demolding core 12 during demolding, thereby avoiding scratches on the undercut 20. Additionally, this structure merely involves formation of the recessed portion 31 of a groove shape in the surface of the undercut 20, thereby preventing reduction in rigidity of the undercut 20 due to the recessed portion 31.

The invention claimed is:

1. A molding die comprising:
    a die body to form a molded article with an undercut, wherein the die body comprises a fixed die and a movable die that acts cooperatively with the fixed die to form the molded article, wherein the molded article is demolded from the movable die in a parting direction along as first axis; and
    a demolding core arranged to move toward and away from the die body, wherein while moving away from the die body, the demolding core elastically deforms the molded article such that the undercut moves away from the die body, thereby making the molded article detachable from the die body, the die body includes a molding surface for forming the undercut, the molding die includes a recessed portion formed in the molding surface of the die body while being reduced in depth gradually and extending in a direction in which the demolding core moves away from the die body, a projecting portion is formed on the undercut in conformity with the shape of the recessed portion during formation of the molded article, during detachment of the molded article, engagement between the projecting portion of the undercut and the recessed portion of the die body restricts movement of the molded article in a direction crossing the movement direction of the demolding core, the direction of movement of the demolding core is perpendicular to, and away from the first axis, the recessed portion of the movable die has a groove shape and extends in the movement direction of the demolding core, and the projecting portion has a ridge shape, and the projection portion of the undercut is formed on a surface of the undercut.

\* \* \* \* \*